Patented July 24, 1928.

1,678,256

UNITED STATES PATENT OFFICE.

MAX KLAR, OF HOLZMINDEN, GERMANY.

PROCESS FOR MANUFACTURING WHITE ACETATE OF LEAD SOLUTIONS OR CRYSTALS OUT OF PYROLIGNEOUS ACID.

No Drawing. Application filed December 22, 1925, Serial No. 77,095, and in Germany October 28, 1924.

By neutralizing crude or redistilled pyroligneous acid liquor with lead or lead compounds organic coloring matters will be formed which contaminate and color the acetate crystals obtained by evaporating and crystallizing the neutralized liquor.

In order to obtain pure acetates, for instance colorless sodium acetate crystals, the raw crystals resulting from the above mentioned operations are to be dried and then heated to the melting point of the waterfree acetate, about above 300 degrees centigrade, whereby the coloring matter will be decomposed or transformed into compounds, which are not soluble in water.

By dissolving the dried and melted raw crystals in water, filtering the solution and crystallizing the concentrated filtrate colorless crystals will be finally obtained, whereby about 15 to 20% of the volatile acids originally contained in the pyroligneous acid will be lost.

This usual standard procedure for the manufacture of colorless sodium acetate crystals out of pyroligneous acid can not be applied to the process for producing colorless acetate of lead crystals, because acetate of lead will be more or less decomposed before this purifying melting begins.

In the prior art relating to the manufacture of colorless acetate of lead crystals therefore, pyroligneous acid could not at all be employed, it was necessary to use as raw material the expensive chemical, pure acetic acid, instead of pyroligneous acid liquor.

The invention relates to an improved process for the manufacture of colorless crystals of acetate of lead, using as raw materials metallic lead or compounds of the same and pyroligneous acid.

I have made the discovery that by heating the dry acetate of lead, even the crude acetate of lead, obtained by neutralizing the pyroligneous acid with lead or lead compounds, to a temperature, at which the organic coloring impurities become insoluble in water, but below the melting point or decomposition temperature of lead acetate, for instance at about 200–220 degrees centigrade, therefore far below its melting point, the coloring matter will be completely carbonized or transformed into compounds insoluble in water.

By dissolving in water the product which has been heated to 200–220 degrees centigrade the filtrate and crystallizing the same, white and pure crystals of acetate of lead will be obtained.

The procedure may be, for instance, carried out as follows: Crude or redistilled pyroligneous acid may be neutraized with metallic lead or with lead compounds giving with acetic acid, lead acetates, and evaporated to dryness. The dry mass may be, immediately or, if necessary after having been broken into pieces, heated to a temperature, at which the impurities become insoluble in water or aqueous acetate of lead solutions, but below the decomposition temperature of lead acetate. One may continue with the heating after the neutralized wood vinegar has been evaporated to dryness. A suitable temperature is between 200–220 degrees centigrade. The time of the said heating depends on the amount and the nature of the coloring impurities. If the conversion or destruction of the coloring organic impurities has sufficiently proceeded, which may be determined by dissolving a sample in water and testing the solution, one allows the mass to cool, and lixiviates, if desired, after crushing or grinding, with water or with solutions of lead acetates, for instance the mother liquors of the crystallization of lead acetate. The lixiviation may be carried out by the counter current method or by the parallel current method. The solution obtained may be treated with decoloring agents, for instance silica gel, fuller's earth, activated carbon. The solutions may be evaporated to the crystallizing point and allowed to crystallize or directly evaporated down to dryness.

The process may be carried out in all stages at ordinary, increased or reduced pressure, in open or closed vessels.

I claim:—

1. The process of obtaining white lead acetate from pyroligneous acid containing organic coloring impurities by neutralizing the said pyroligneous acid with lead or lead compounds, producing from the said solution lead acetate in solid form, heating the said solid lead acetate to temperatures between 200–220° centigrade at which temperatures the organic coloring impurities become insoluble in water but below the decomposition temperature of lead acetate, lixiviating the said lead acetate with water and filtering, evaporating and crystallizing the same.

2. The process for obtaining white lead acetate crystals or solutions of the same from pyroligneous acid, containing or forming organic coloring impurities which consists in neutralizing the said pyroligneous acid with lead or lead compounds, making from the said solution, solid lead acetate, heating the solid lead acetate to temperatures between 200–220 degrees centigrade, at which the organic coloring impurities become insoluble in water but below the decomposition temperature of lead acetate, lixiviating with aqueous solutions of lead acetate and causing decolorizing agents to act on said solutions, filtering, evaporating, and crystallizing.

In testimony whereof I hereunto affix my signature.

MAX KLAR.